No. 851,156. PATENTED APR. 23, 1907.
J. BROICH.
GALVANOMETER.
APPLICATION FILED JUNE 27, 1906.

2 SHEETS—SHEET 1.

Witnesses:
Chas. D. King.
R. Champion

Inventor:
Joseph Broich,
by _____
Atty.

No. 851,156. PATENTED APR. 23, 1907.
J. BROICH.
GALVANOMETER.
APPLICATION FILED JUNE 27, 1906.

2 SHEETS—SHEET 2.

Witnesses:
Chas. D. King.
R. Champion

Inventor:
Joseph Broich
by ............
Atty.

UNITED STATES PATENT OFFICE.

JOSEPH BROICH, OF BROOKLYN, NEW YORK.

GALVANOMETER.

No. 851,156.　　　Specification of Letters Patent.　　　Patented April 23, 1907.

Application filed June 27, 1906. Serial No. 323,577.

*To all whom it may concern:*

Be it known that I, JOSEPH BROICH, a citizen of the United States, and a resident of Brooklyn, in the county of Kings and State of New York, have invented certain new and useful Improvements in Galvanometers, of which the following is a specification.

This invention relates to improvements in galvanometers, and particularly to a device for preventing injury to the delicate pivoted or suspended movable coil of a galvanometer when the instrument is not in use.

The principal feature of my invention is a device by means of which the movable coil of a galvanometer may be held in such a manner that it will be immovable in the direction of its axis when not in use, the device employed by me for this purpose being not only simple in construction and capable of manufacture and application to electrical measuring instruments at a low cost, but also so constructed as not to interfere in any way with the operation of the movable parts of the instrument or impair its accuracy as a measuring instrument.

Figure 1:
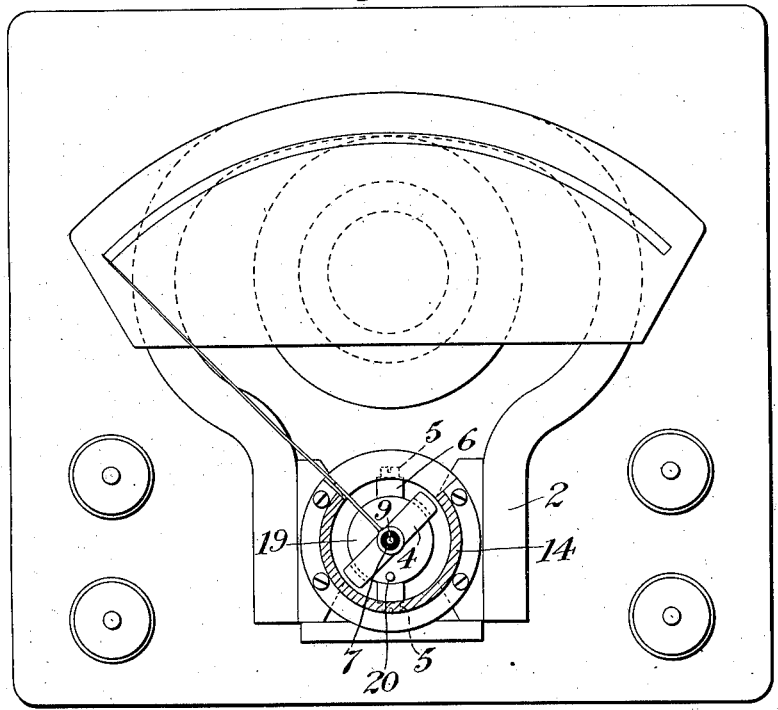
Figure 2:
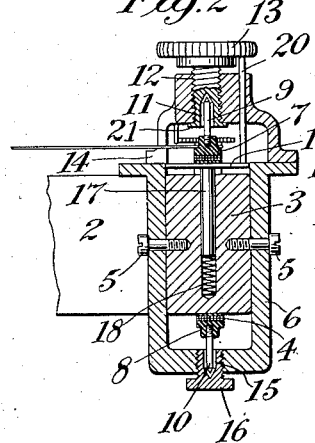
Figure 3:
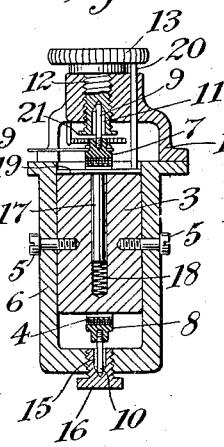
Figure 4:
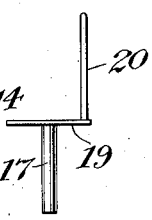
Figure 5:
Figure 6:
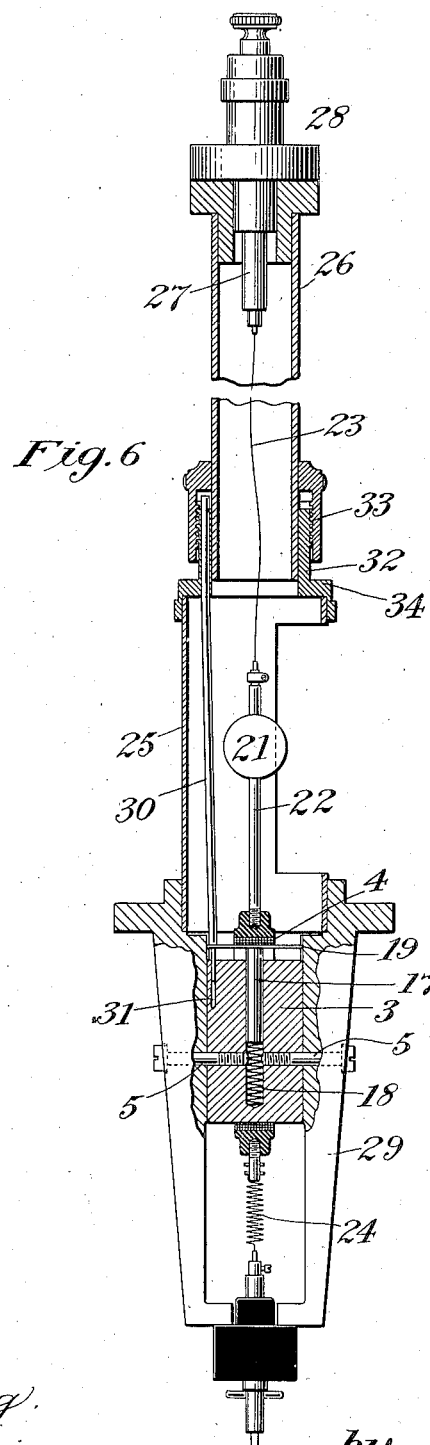

In the drawings accompanying this specification and forming part of the present application, Figure 1 is a plan, partly in section and with parts removed, of an electrical measuring instrument containing a movable galvanometer coil to which is applied a device for arresting or holding the movable coil in fixed position when not in use. Fig. 2 is a central vertical section of the main portion of said instrument, showing the movable coil held in a fixed position out of action by means of my improved arresting device. Fig. 3 is a similar view showing the movable coil in its normal position with the arresting device held out of action. Figs. 4 and 5 are details illustrating respectively in elevation and in plan the main element of the arresting device. Fig. 6 is a longitudinal section, partly in elevation, of a galvanometer of the filar suspension type having my improvements applied thereto.

Similar characters designate like parts in all the figures of the drawings.

My invention may be applied to an electrical measuring instrument or galvanometer of any type containing a movable coil, but is illustrated in Figs. 1 to 5 inclusive as applied to an ammeter of a well known type, in which 2 indicates the usual field magnet, 3 a core of magnetizable material, such as soft iron, in fixed relation with the pole pieces of the field magnet 2, and 4 a movable coil also of a well-known type. The core 3 may be secured to the pole-pieces of the field magnet 2 in any suitable manner, as for example, by the set-screws 5 at opposite sides of the core, which set-screws pass through the frame 6 fastened to the pole-pieces of the field magnet. All of these parts are or may be of well known construction.

At the opposite ends thereof the movable coil has insulating blocks, such as 7 and 8, cemented thereto but placed outside of the coils of wire wrapped around the frame of the movable coil 4. In these insulating blocks 7 and 8 are inserted the usual pivot-pins 9 and 10 for supporting the movable coil in its bearings. These bearings for the pivot-pins 9 and 10 may be of any suitable type, provided at least one of them is capable of adjustment toward and from the other a sufficient distance to permit the ends of the pivots 9 and 10 to clear their bearings when the instrument is not in use. A movement of one-eighth of an inch or less is ample for this purpose. I prefer to obtain the desired adjustment in the type of galvanometer shown in Figs. 1 to 5 by forming one of the bearings, such as 11, in a screw, such as 12, having a relatively large head 13, the under side or cheek of which is accurately faced, as is the cheek of the coacting part, such as the cap-piece 14 in which said screw is threaded. This cap-piece 14 is firmly secured to the frame 6 and is therefore also in fixed relation with the field magnet and its poles and also with the core 3, these parts being so organized as to be practically a unitary structure, none of the parts of which when assembled are moved relatively to the others. The cap-piece 14 is vertically bored and threaded in alinement with the axis of the core 3 for the reception of the cap-screw 12 containing the bearing 11, and it will be understood that when said screw 12 is screwed down to the limit of its movement, with the cheek of its head in engagement with the cheek of the cap-piece 14, the upper bearing will be in its proper adjusted position for coaction with the upper pivot 9 of the movable coil 3. The lower pivot 10 may work in a bearing 15 in a short screw or removable bearing piece 16 which when once placed in position is not intended to be afterward adjusted. When so placed in this proper position the lower bearing will coact with the pivot 10 in such a manner as to cooperate properly with the upper pivot and the upper adjustable bearing.

The normal positions of the parts when in action are illustrated in Fig. 3, in which it will be seen that the movable coil which surrounds the core 3 at a slight distance therefrom is free to move about its axis and is unrestrained in the direction of its axis except by the pivot-pins 9 and 10 bearing against their bearing surfaces. In such position, the bearings are liable to be injured by any sudden shock which the instrument may sustain. It has been found in practice that when instruments of this kind are not in use, and particularly during shipment, the movable coil, unless positively held so that it can not move in the direction of its axis, frequently injures and spoils the bearings in which the pivot-pins 9 and 10 are seated when the instrument is roughly handled. The reason for this is that the weight of the movable coil is such as to cause the sharp points of the delicate pivot-pins to dig into the bearings when the instrument is roughly jarred or dropped during shipment, or otherwise roughly handled. In order to prevent spoiling of the bearings by such jarring of the movable coil I provide means for holding the movable coil in a fixed position with the pivots 9 and 10 out of contact with their bearings during shipment of the instrument, or at any time when the instrument is not in use. In order to accomplish this result I provide means preferably carried by the core 3, for holding the movable coil in such a manner when the instrument is not in use that it will be impossible for such coil to move in the direction of its axis. A device suitable for this purpose is a spring or spring-pressed actuator adapted to force the movable coil against and hold it in contact with a suitable stop-face. Preferably the movable coil which surrounds the core 3, and as before stated, and as is well known, has a slight clear space around it between it and the core, is pressed into engagement with one end of the core and held firmly in that position when the instrument is not being used. For this purpose I have illustrated at 17 a pin carried by the core 3 and pressed by a spring 18 into engagement with the movable coil at the inner side thereof. This pin 17 is preferably seated and works in a central axial bore in the core 3, at the extreme end of which bore a spring 18 is normally under compression, but when released serves to force the pin 17 up and with it the movable coil, until the inner side of the movable coil at its lower end comes in contact with the lower end of the core 3, as shown in Fig. 2. At its upper end the pin 17 may have rigid therewith a disc 19, in order that the movable coil may be pressed upward by the pin regardless of the angular position of the coil about its axis.

It will be clear from the foregoing that the spring-pressed pin and disc just described will operate to hold the movable coil out of action at all times unless such pin and disc are themselves held out of action. Normally said pin and disc will be held out of action and the spring 18 will be under compression. In order to control these parts I may make use of any suitable means for holding them out of action, they being preferably controlled by the screw 12, which will hold the pin 17 out of action or permit it to come into action according as said screw is adjusted to shift said bearing away from or into its operative position. Here the disc 19 has projecting therefrom at one side thereof a pin 20 which passes through a bore in the cap-piece 14, which bore is parallel with the screw-threaded bore in which the screw 12 works. The upper end of the pin 20 rests against the under side of the head 13 of the screw 12. When the screw 12 is screwed down to its working position, as shown in Fig. 3, the pin 20, disc 19 and pin 17 will also be forced down, and the movable coil will be permitted to move freely about its axis and will only be restrained in the direction of its axis by the engagement of the ends of its pivot-pins with their end bearings. When, however, the screw 12 is unscrewed, as shown in Fig. 2, and the upper bearing shifted away from its pivot-pin a suitable distance, which should always be the same and is fixed by a stop 21, and with it will move the disc 19 and the pin 17, these three parts (shown separately in Fig. 4) being forced upward by the spring 18 as the upper bearing is unscrewed and shifted away from the lower bearing. When the parts reach the positions shown in Fig. 2, the movable coil will be stopped against the under side of the core 3 and will be held positively in that position by the pressure of the spring 18 against the pin and disc in contact with the inner side of the upper end of the movable coil. In this position both pivot-pins 9 and 10 will be clear of their end bearings, and no ordinary jar or shock will be sufficient to cause such a movement of the movable coil in the direction of its axis as to force either pivot-pin into engagement with its bearing. Thus by simply unscrewing the upper bearing when the instrument is not in use or is to be shipped to a distance, injury to the pivots or bearings of the instrument will be positively prevented.

In Fig. 6 I have shown my improved arresting device applied to a galvanometer of the filar suspension type. All of the parts of this instrument except the arresting device are of well-known construction—the movable coil 4, core 3, the mirror 21 and its support 22, the filar suspension 23 connected to the upper end of the support 22 for the movable coil and the spring 24 connected to the lower end of said coil, the mirror-case 25, the tube 26, and the rod 27 and adjusting devices 28 for holding and supporting the filar suspension—and hence they need not be described in detail. The movable coil 4 surrounds the core 3 at a slight distance therefrom in the same manner as shown in Fig. 2, and the core is held rigidly in place in the frame 29 by screws 5.

The arresting device used in connection with the movable coil of this galvanometer is in most respects identical in construction with that illustrated in Figs. 1 to 5. It comprises a pin 17 working in an axial bore in the core 3 and normally pressed upward by a coiled spring 18 in the lower end of said bore. At its upper end the spring-pressed pin 17 is attached to a disc 19 which presses against the inner side of the upper end of the movable coil and forces the movable coil upward when the spring 18 is released, in the same manner that this action is accomplished in the construction shown in Figs. 1 to 5. The means employed, however, for holding the arresting device out of action is somewhat different from that illustrated in the main views, and this is due principally to the difference in the two types of instruments. A long rod 30 reduced in diameter at its lower end and passing through an opening in one side of the disc 19 and guided at its lower end in a bore 31 at one side of the core 3, is here shown as the means for forcing the disc 19 and the pin 17 down when the instrument is in use. At its upper end the rod 30 is also guided in a longitudinal bore at one edge of an externally threaded collar 32, on which works a knurled adjusting-cap or nut 33. This threaded cap 33 and the upper end of the rod 30 are so placed that the upper end of the rod is in position to be forced down by the inner side of the head of the cap. When so forced down by the screwing down of said cap into contact with the wide annular stop-face or cheek 34 of the collar 32, the arresting device will be held out of action by the rod 30, and the instrument will be in its operative position. When the cap is unscrewed, as shown in Fig. 6, the spring 18 will force the parts to the position shown in said figure, and the movable coil will be held firmly in contact with the under side of the core 3, in which position it will be out of action and there will be no strain on the filar suspension 23. In this instrument, as in that shown in the main views, the arresting device and the means for holding it out of action are so constructed and so organized with respect to the other parts that the accuracy of the instrument as a means for effecting delicate electrical measurements is not in any way impaired.

What I claim is:

1. In a galvanometer, the combination with a movable coil having pivots at its opposite ends, of end bearings for said pivots one of which is movable relatively to the other and the other of which is fixed in all positions of the pivots, and means for holding the pivots of said movable coil out of contact with said end bearings.

2. In a galvanometer, the combination with a movable coil having pivots secured to its opposite ends in the line of its axis, end bearings for said pivots one of which bearings is movable relatively to the other and embodies stops for locating it in two extreme positions, and means for holding said movable coil in fixed position with its pivots out of contact with said end bearings.

3. In a galvanometer, the combination with a field magnet and a core in fixed relation with each other, of a movable coil having pivots at its opposite ends, end bearings for said pivots one of which is adjustable relatively to the other, and means carried by the core for holding said movable coil in a fixed position in contact with one end of the core and with its pivots out of contact with said end bearings.

4. In a galvanometer, the combination with a movable coil having pivots at its opposite ends, of end bearings for said pivots one of which is embodied in a screw-threaded member adjustable relatively to the other bearing in the direction of the axis of the bearing, and means controlled by said screw-threaded member for holding the pivots of said movable coil out of contact with said end bearings when the end bearings are adjusted farther apart than the distance between said pivots.

5. In a galvanometer, the combination with a field magnet and a core in fixed relation with each other, of a movable coil having pivots at its opposite ends, end bearings for said pivots one of which is embodied in a screw-threaded member adjustable relatively to the other bearing in the direction of the axis of the bearing, and a spring-pressed arresting device carried by said core for holding said movable coil in a fixed position in the direction of the axis of the core, and normally held out of action by said screw-threaded member when the end bearings are adjusted farther apart than the distance between the pivots.

6. In a galvanometer, the combination with a field magnet and a core in fixed relation with each other, of a movable coil, means for supporting said movable coil, and means carried by said core for preventing movement of said movable coil in the direction of the axis of said core.

7. In a galvanometer, the combination with a field magnet and a core in fixed relation with each other, of a movable coil, means for supporting said movable coil, and means carried by said coil for holding said movable coil in a fixed position in contact with one end of the core.

8. In a galvanometer, the combination with a field magnet and a core in fixed relation with each other, of a movable coil, means for supporting said movable coil, and spring-actuated means carried by said core for holding said movable coil in a fixed position in contact with one end of the core.

9. In a galvanometer, the combination with a field magnet and a core in fixed relation with each other, of a movable coil surrounding and normally clear of said core and shiftable into contact with one end of the core, means for supporting said movable coil, and means carried by said core and in engagement with one end of the movable coil for holding said movable coil in contact with one end of the core.

10. In a galvanometer, the combination with a field magnet and a core in fixed relation with each other, of a movable coil surrounding and normally clear of said core, means for supporting said movable coil, and a spring-pressed pin working in said core and in engagement with one end of the movable coil for holding said movable coil in contact with the opposite end of the core.

11. In a galvanometer, the combination with a field magnet and with an axially bored core in fixed relation with each other, of a movable coil surrounding and normally clear of said core, means for supporting said movable coil, and a spring-pressed pin working in said bore in the core and having a disc head in engagement with one end of the movable coil for holding said movable coil in contact with the opposite end of the core in any angular position of said coil.

12. In a galvanometer, the combination with a field magnet and a core in fixed relation with each other, of a movable coil, means for supporting said movable coil, an arresting device carried by said core for preventing movement of said movable coil in the direction of the axis of said core, and means for holding said arresting device out of action.

13. In a galvanometer, the combination with a field magnet and a core in fixed relation with each other, of a movable coil shiftable into contact with one end of the core, means for supporting said movable coil, an arresting device carried by said core for holding said movable coil in a fixed position in contact with one end of the core, and means for holding said arresting device out of action.

14. In a galvanometer, the combination with a field magnet and a core in fixed relation with each other, of a movable coil, means for supporting said movable coil, a spring-actuated arresting device carried by said core for holding said movable coil in a fixed position in the direction of the axis of said core, and means for holding said arresting device out of action.

15. In a galvanometer, the combination with a field magnet and a core in fixed relation with each other, of a movable coil surrounding and normally clear of said core, means for supporting said movable coil, an arresting device carried by said core and in engagement with one end of the movable coil for holding said movable coil in contact with one end of the core, and means for holding said arresting device out of action.

16. In a galvanometer, the combination with a field magnet and a core in fixed relation with each other, of a movable coil, means for supporting said movable coil, an arresting device carried by said core for preventing movement of said movable coil in the direction of the axis of said core, and means including a screw-threaded adjusting device for holding said arresting device out of action.

17. In a galvanometer, the combination with a field magnet and a core in fixed relation with each other, of a movable coil surrounding and normally clear of said core, means for supporting said movable coil, a spring-pressed pin working in said core and in engagement with one end of the movable coil for holding said movable coil in a fixed position in the direction of the axis of said core, and means including a screw-threaded adjusting device for holding said arresting device out of action.

Signed at New York, in the county of New York, and State of New York, this 22nd day of June, A. D. 1906.

JOSEPH BROICH.

Witnesses:
EDGAR A. FELLOWS,
ROBERT CHAMPION.